(12) United States Patent
Miyazaki et al.

(10) Patent No.: US 10,718,725 B2
(45) Date of Patent: Jul. 21, 2020

(54) X-RAY INSPECTION APPARATUS AND CORRECTION METHOD FOR X-RAY INSPECTION APPARATUS

(71) Applicant: ANRITSU INFIVIS CO., LTD., Kanagawa (JP)

(72) Inventors: Itaru Miyazaki, Kanagawa (JP); Akihiro Tanaka, Kanagawa (JP); Takashi Kanai, Kanagawa (JP); Hisashi Hayashi, Kanagawa (JP)

(73) Assignee: ANRITSU INFIVIS CO., LTD., Kanagawa (JP)

( * ) Notice: Subject to any disclaimer, the term of this patent is extended or adjusted under 35 U.S.C. 154(b) by 37 days.

(21) Appl. No.: 16/020,163

(22) Filed: Jun. 27, 2018

(65) Prior Publication Data

US 2019/0003989 A1 Jan. 3, 2019

(30) Foreign Application Priority Data

Jun. 30, 2017 (JP) ................................ 2017-128400

(51) Int. Cl.
*G01N 23/04* (2018.01)
*G01N 23/046* (2018.01)
(Continued)

(52) U.S. Cl.
CPC .............. *G01N 23/18* (2013.01); *G01N 23/04* (2013.01); *G01N 23/043* (2013.01);
(Continued)

(58) Field of Classification Search
CPC ...... G01N 23/04; G01N 23/06; G01N 23/083; G01N 23/087; G01N 23/18; G01N 23/046;
(Continued)

(56) References Cited

U.S. PATENT DOCUMENTS 5,585,603 A * 12/1996 Vogeley, Jr. ........... G01G 9/005
177/1
6,313,477 B1 * 11/2001 Yasuda .................. G01N 23/04
250/584

(Continued)

FOREIGN PATENT DOCUMENTS

JP  2004-251669 A  9/2004
JP  2005-091016 A  4/2005

OTHER PUBLICATIONS

An English translation of JP2004-251669A by Patent Translate dated May 25, 2020.*

*Primary Examiner* — Allen C. Ho
(74) *Attorney, Agent, or Firm* — Pearne & Gordon LLP (57) ABSTRACT

To correctly acquire image data of an inspected article by preventing a difference in shade between images caused by a difference in position or sensitivity between sensor elements. An X-ray generation source irradiates an inspection region where an inspected article passes with an X-ray. X-ray detection means receives the X-ray passing through the inspection region using a plurality of sensor elements. Image data generation means generates image data of the inspected article from an output of the X-ray detection means. Incidence condition changing means changes two or more kinds of X-ray incidence conditions common for all of the plurality of sensor elements of the X-ray detection means in a state of absence of the inspected article in the inspection region. Correction data generation means acquires correction data that is needed for making a shade of an image uniform for each incidence condition.

12 Claims, 9 Drawing Sheets

(51) Int. Cl.
*G01N 23/06* (2018.01)
*G01N 23/083* (2018.01)
*G01N 23/087* (2018.01)
*G01N 23/10* (2018.01)
*G01N 23/18* (2018.01)
*G06T 7/00* (2017.01)

(52) U.S. Cl.
CPC .......... *G01N 23/046* (2013.01); *G01N 23/06* (2013.01); *G01N 23/083* (2013.01); *G01N 23/087* (2013.01); *G01N 23/10* (2013.01); *G06T 7/0008* (2013.01); *G01N 2223/313* (2013.01); *G01N 2223/32* (2013.01); *G01N 2223/3308* (2013.01); *G01N 2223/401* (2013.01); *G01N 2223/643* (2013.01); *G01N 2223/652* (2013.01)

(58) Field of Classification Search
CPC .... G01N 23/10; G01N 23/043; G01V 5/0016; G01V 5/0041; G01V 5/005
USPC .......... 378/51, 53, 54, 57, 58, 62, 98.8, 98.9, 378/98.11, 207
See application file for complete search history.

(56) References Cited

U.S. PATENT DOCUMENTS

| | | | | |
|---|---|---|---|---|
| 7,085,430 B2* | 8/2006 | Winsor | ............ | A61B 6/583 382/132 |
| 7,260,173 B2* | 8/2007 | Wakayama | .......... | G01N 23/046 378/19 |
| 7,272,510 B2* | 9/2007 | Hansen | ............ | G01N 21/274 702/28 |
| 7,327,824 B2* | 2/2008 | Gohno | ............ | A61B 6/032 250/366 |
| 7,417,440 B2* | 8/2008 | Peschmann | .......... | G01V 5/0016 250/250 |
| 7,477,726 B2* | 1/2009 | Kabumoto | ............ | G01N 23/06 378/205 |
| 7,561,663 B2* | 7/2009 | Watanabe | .......... | G01N 23/083 378/51 |
| 7,769,132 B1* | 8/2010 | Hurd | ............ | A61B 5/0033 378/57 |
| 7,819,581 B2* | 10/2010 | Srinivasan | .......... | G01T 7/005 378/19 |
| 7,980,760 B2* | 7/2011 | Kabumoto | ............ | G01N 23/04 378/207 |
| 7,991,110 B2* | 8/2011 | Hirose | ............ | G01N 23/02 378/51 |
| 8,005,189 B2* | 8/2011 | Ripp | ............ | G01V 5/0008 190/102 |
| 8,068,656 B2* | 11/2011 | Hirose | ............ | G01N 23/04 382/132 |
| 8,081,733 B2* | 12/2011 | Basu | ............ | G01N 23/046 378/19 |
| 8,184,766 B2* | 5/2012 | Fuchs | ............ | G01N 23/046 378/6 |
| 8,194,821 B2* | 6/2012 | Seppi | ............ | G21K 1/10 378/2 |
| 8,223,922 B2* | 7/2012 | Suyama | ............ | G01V 5/0041 378/98.9 |
| 8,280,005 B2* | 10/2012 | Suyama | ............ | G01T 1/00 250/370.09 |
| 8,369,481 B2* | 2/2013 | Shimada | ............ | G01N 23/06 378/57 |
| 8,447,012 B2* | 5/2013 | Ichizawa | ............ | A61B 6/583 378/113 |
| 8,483,475 B2* | 7/2013 | Kabumoto | ......... | G01N 21/3581 382/141 |
| 8,488,744 B2* | 7/2013 | Ichizawa | ............ | G01N 23/083 378/156 |
| 8,565,377 B2* | 10/2013 | Robar | ............ | A61N 5/1049 378/62 |
| 8,724,774 B2* | 5/2014 | Langeveld | .......... | G01N 23/085 378/53 |
| 8,867,816 B2* | 10/2014 | Bouchard | ............ | G01F 23/288 382/101 |
| 8,873,713 B2* | 10/2014 | Suyama | ............ | G01V 5/005 250/370.09 |
| 8,912,503 B2* | 12/2014 | Matoba | ............ | G01N 23/083 250/394 |
| 8,981,310 B2* | 3/2015 | Suyama | ............ | G01V 5/005 250/370.11 |
| 8,989,345 B2* | 3/2015 | Kim | ............ | G01N 9/24 378/207 |
| 9,263,164 B2* | 2/2016 | Goldammer | ......... | A61B 6/4035 |
| 9,300,936 B2* | 3/2016 | Schmitt | ............ | G01N 23/046 |
| 9,329,301 B2* | 5/2016 | Suyama | ............ | G01V 5/0041 |
| 9,348,055 B2* | 5/2016 | Abenaim | ............ | G01V 5/0016 |
| 9,367,903 B2* | 6/2016 | Goldammer | ......... | A61B 6/4035 |
| 9,528,947 B2* | 12/2016 | Kang | ............ | G01T 7/005 |
| 9,528,948 B2* | 12/2016 | Lüghausen | ............ | G01N 23/04 |
| 9,566,615 B2* | 2/2017 | Fujii | ............ | B07C 5/346 |
| 9,696,266 B2* | 7/2017 | Suyama | ............ | G01N 23/083 |
| 9,752,996 B2* | 9/2017 | Sugimoto | ............ | G01N 23/04 |
| 9,846,244 B2* | 12/2017 | Abraham | ............ | H04N 5/32 |
| 9,863,896 B2* | 1/2018 | Matoba | ............ | G01N 23/083 |
| 9,865,424 B2* | 1/2018 | Ikeda | ............ | G01N 23/04 |
| 9,880,314 B2* | 1/2018 | Pfander | ............ | G01V 5/0008 |
| 9,980,697 B2* | 5/2018 | Dujmic | ............ | A61B 6/585 |
| 10,054,432 B2* | 8/2018 | Kasahara | ............ | G06T 7/55 |
| 10,054,555 B2* | 8/2018 | Matoba | ............ | G01N 23/04 |
| 10,078,150 B2* | 9/2018 | Deinert | ............ | G01V 5/0016 |
| 10,098,216 B2* | 10/2018 | Kabumoto | ............ | H05G 1/26 |
| 10,197,513 B2* | 2/2019 | Kullenberg | ......... | G01N 23/2206 |
| 10,254,436 B2* | 4/2019 | Awad | ............ | G01V 5/005 |
| 10,261,033 B2* | 4/2019 | Jimenez, Jr. | .......... | G01N 23/04 |
| 10,267,751 B2* | 4/2019 | Suyama | ............ | G01N 23/04 |
| 10,345,479 B2* | 7/2019 | Langeveld | .......... | G01V 5/0041 |
| 10,371,648 B2* | 8/2019 | Zhang | ............ | G01V 5/0041 |
| 10,376,926 B2* | 8/2019 | Makino | ............ | G01N 23/04 |
| 10,386,502 B2* | 8/2019 | Li | ............ | G01T 1/2018 |
| 10,422,757 B2* | 9/2019 | Sugimoto | ............ | G01N 23/18 |
| 10,444,166 B2* | 10/2019 | Onishi | ............ | G01T 7/00 |
| 10,495,776 B2* | 12/2019 | Kang | ............ | G01T 1/29 |
| 2014/0294151 A1 | 10/2014 | Suyama | | |
| 2018/0214113 A1 | 8/2018 | Yamakawa et al. | | |

* cited by examiner

(Transmission image data in range $R_1$)

| A (1, 1, 1) | A (1, 2, 1) | A (1, 3, 1) | X-ray sensor $31_1$ |
|---|---|---|---|
| A (1, 1, 2) | A (1, 2, 2) | A (1, 3, 2) | X-ray sensor $31_2$ |
| A (1, 1, 3) | A (1, 2, 3) | A (1, 3, 3) | X-ray sensor $31_3$ |
| T 1 | T 2 | T 3 | |

Scan time period ⟶

FIG.4B

(Transmission image data in range $R_2$)

| A (2, 1, 1) | A (2, 2, 1) | A (2, 3, 1) | X-ray sensor $31_1$ |
|---|---|---|---|
| A (2, 1, 2) | A (2, 2, 2) | A (2, 3, 2) | X-ray sensor $31_2$ |
| A (2, 1, 3) | A (2, 2, 3) | A (2, 3, 3) | X-ray sensor $31_3$ |
| T 1 | T 2 | T 3 | |

Scan time period ⟶

FIG.4C

(Transmission image data in range $R_3$)

| A (3, 1, 1) | A (3, 2, 1) | A (3, 3, 1) | X-ray sensor $31_1$ |
|---|---|---|---|
| A (3, 1, 2) | A (3, 2, 2) | A (3, 3, 2) | X-ray sensor $31_2$ |
| A (3, 1, 3) | A (3, 2, 3) | A (3, 3, 3) | X-ray sensor $31_3$ |
| T 1 | T 2 | T 3 | |

Scan time period ⟶

(Prior Art)

FIG. 13

(Prior Art)

X-RAY INSPECTION APPARATUS AND CORRECTION METHOD FOR X-RAY INSPECTION APPARATUS

TECHNICAL FIELD

The present invention relates to a technology for improving the inspection accuracy of an article inspection apparatus that checks the presence of a defect such as foreign object intrusion and a missing ingredient in a product such as food.

BACKGROUND ART

In a factory where food and the like are produced, a product is automatically inspected during its transport by a conveyor or the like using an article inspection apparatus for checking the presence of a defect such as foreign object intrusion and a missing ingredient in the product, and the product is categorized as a normal product or a defective product.

Particularly, a product such as food needs to be closely inspected for the presence of an intruding foreign object such as metal or plastic. Therefore, an article inspection apparatus that uses an X-ray has been developed in recent years.

Generally, in the article inspection apparatus that uses an X-ray, an X-ray that has a width in a direction orthogonal to the passing direction of an inspected article is emitted to a passage of the inspected article. The X-ray that is transmitted through the inspected article is received by a plurality of sensor elements that are arranged in the direction orthogonal to the passing direction of the inspected article. Image information that represents a difference in X-ray transmittance between each part of the inspected article with light and shade is acquired, and various processes are performed on the image information to determine the presence of foreign object intrusion or the presence of a missing or damaged ingredient and the like.

In addition to a change in transmittance caused by the presence of foreign object intrusion, the presence of a damaged or missing ingredient, and the like in the inspected article, a difference in distance to each X-ray sensor element from the X-ray source due to the spreading emission of the X-ray toward an inspection region makes the intensity of the X-ray incident on each sensor element non-uniform in the article inspection apparatus that uses the X-ray.

In addition, a difference in sensitivity between each sensor elements occurs, and a difference in sensitivity between each array or each module also occurs in an arrangement of a plurality of arrays or modules, each of which is configured with a plurality of sensor elements.

Figure 13:
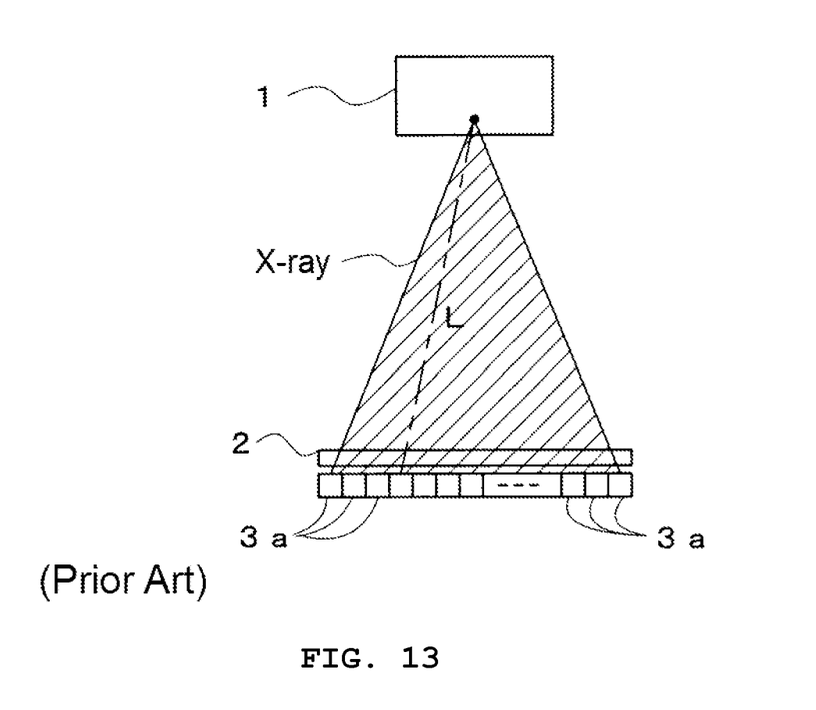
FIG. 13 is a diagram illustrating a positional relationship between an X-ray generation source and sensor elements.
Figure 14:
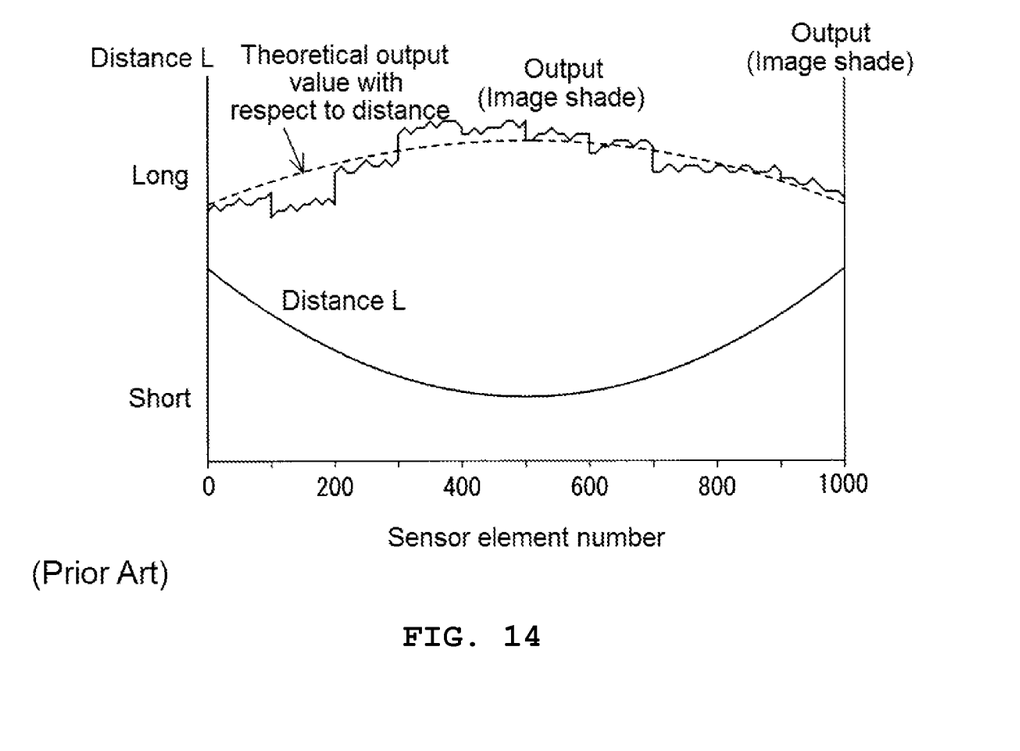
FIG. 14 is a graph illustrating a relationship between an output and a distance to each sensor element from the X-ray generation source.

For example, as illustrated in FIG. 13, in a state of the absence of the inspected article, if an X-ray that is generated by an X-ray generation source 1 is emitted from above the center in the width direction of a transport belt 2 and spreads in a fan shape in the width direction of the belt, and the X-ray that is transmitted through the transport belt 2 is detected by sensor elements 3a, 3a, . . . , 3a arranged in the width direction of the transport belt 2, a distance L to each of the sensor elements 3a, 3a, . . . , 3a from the X-ray generation source 1 is the shortest at the center and is increased toward both ends as illustrated in FIG. 14. Accordingly, as illustrated by a dotted line, the output of each of the sensor elements 3a, 3a, . . . , 3a (or the shade of an image acquired from the output) is theoretically the highest in the central part and tends to be decreased toward both ends as opposed to the change in the length L. In addition to such a change, a difference in sensitivity between each array, a difference in sensitivity between each sensor element in the array, and the like cause the output value of each sensor element to vary and also affect the image acquired from the output.

Accordingly, the output of each sensor element needs to be corrected in advance in order to correctly acquire the X-ray transmittance of each part of the inspected article when the article for inspection is transported.

As such a correction method, correction means for performing correction that equalizes the output of each sensor element or the shade of the image acquired from the output at a transmittance of 100% given that the transmittance in the state of the absence of the inspected article is set as 100% is provided in the related art.

For example, such a method of performing correction in the state of the transmittance of 100% is disclosed in Patent Document 1.

RELATED ART DOCUMENT

Patent Document

[Patent Document 1] JP-A-2005-91016

DISCLOSURE OF THE INVENTION

Problem that the Invention is to Solve

Even if correction that equalizes the output of each sensor element acquired in the state of the absence of the inspected article, that is, the state of the transmittance of 100%, is performed as described above, the difference in sensitivity between the sensor elements may vary in a low transmittance region, and correct image data may not be acquired when the transmittance is low in the presence of the inspected article.

An object of the invention for solving such a problem is to provide an X-ray inspection apparatus and a correction method for an X-ray inspection apparatus that can correctly acquire image data of an inspected article in a wide transmittance range by preventing a difference in shade between images caused by a difference in position or sensitivity between sensor elements.

Means for Solving the Problem

In order to achieve the above object, an X-ray inspection apparatus according to Claim 1 of the invention includes transport means (21) for transporting an inspected article to pass through a predetermined inspection region, an X-ray generation source (22) that irradiates the inspection region with an X-ray, X-ray detection means (30) for receiving the X-ray passing through the inspection region using a plurality of sensor elements that are linearly arranged in a direction intersecting with a transport direction of the inspected article, image data generation means (40) for generating image data of the inspected article from an output of the X-ray detection means, incidence condition changing means (60) for changing two or more kinds of X-ray incidence conditions common for all of the sensor elements of the X-ray detection means in a state of absence of the inspected article in the inspection region, correction data generation means (70) for acquiring correction data that is needed for making a shade of an image of the image data acquired by the image data generation means uniform for each incidence condition changed by the incidence condition changing means, correction means (80) for correcting the image data acquired when the inspected article passes through the inspection region, based on the correction data, and determination means (50) for determining quality of the inspected article from the image data corrected by the correction means.

An X-ray inspection apparatus according to Claim 2 of the invention is the X-ray inspection apparatus according to Claim 1, in which the incidence condition changing means includes a correction member (61) that is disposed between the X-ray generation source and the X-ray detection means and changes an X-ray transmittance.

An X-ray inspection apparatus according to Claim 3 of the invention is the X-ray inspection apparatus according to Claim 1, in which the incidence condition changing means includes means for changing at least one of a tube voltage or a tube current in the X-ray generation source.

An X-ray inspection apparatus according to Claim 4 of the invention is the X-ray inspection apparatus according to Claim 2, further including a correction data memory (75) in which the correction data is stored, in which the correction data that is generated using the correction member corresponding to a plurality of kinds of inspected articles for each inspected article is stored in the correction data memory, and the correction means corrects the image data by selecting the correction data appropriate for the inspected article from the correction data memory.

An X-ray inspection apparatus according to Claim 5 of the invention is the X-ray inspection apparatus according to Claim 1, in which the X-ray detection means is configured with a plurality of sensor arrays, each of which is configured by arranging a plurality of the sensor elements at predetermined intervals as a single body, and the correction data generation means uses correction data specific to each sensor array as a part of the correction data needed for making the shade of the image acquired by the image data generation means uniform.

An X-ray inspection apparatus according to Claim 6 of the invention is the X-ray inspection apparatus according to Claim 1, in which the sensor elements of the X-ray detection means have an energy discrimination function.

A correction method for an X-ray inspection apparatus according to Claim 7 of the invention is a correction method for an X-ray inspection apparatus that irradiates a predetermined inspection region where an inspected article passes with an X-ray, receives the X-ray passing through the inspection region using a plurality of sensor elements arranged in a direction intersecting with a transport direction of the inspected article, and determines quality of the inspected article from image data of the inspected article generated from an output of the plurality of sensor elements. The method includes a step of changing two or more kinds of X-ray incidence conditions common for all of the plurality of sensor elements in a state of absence of the inspected article in the inspection region, a step of acquiring correction data that is needed for making a shade of an image of the acquired image data uniform for each of the changed incidence conditions, and a step of correcting the image data acquired when the inspected article passes through the inspection region, based on the correction data.

Advantage of the Invention

The X-ray inspection apparatus and the correction method for the X-ray inspection apparatus of the invention change two or more kinds of X-ray incidence conditions common for a plurality of X-ray detection sensor elements in a state of absence of an inspected article of an inspection target in an inspection region, acquire correction data that is needed for making a shade of acquired image data uniform for each incidence condition, and correct the image data acquired when the inspected article of the inspection target passes through the inspection region, using the correction data.

Thus, the shade of the image is corrected with significantly higher accuracy than correction in the related art that uses only image data in the state of the absence of the inspected article (transmittance of 100%). The image data can be accurately acquired within a wide transmittance range caused by the passing of the inspected article, and a foreign object and the like can be correctly determined.

As the incidence condition changing means, either the correction member as in Claim 2 may be used, the tube voltage or the tube current of the X-ray generation source as in Claim 3 may be changed, or two or more kinds of incidence conditions may be changed by combining the correction member with the changing of the tube voltage or the tube current of the X-ray generation source.

If the correction data appropriate for the inspected article is read from the correction data memory and used for correcting the image data acquired for the inspected article of the inspection target as in Claim 4, the image can be automatically corrected based on optimal correction data even if inspection is performed in a state where the article type is changed, or articles of similar article types coexist.

BEST MODE FOR CARRYING OUT THE INVENTION

Hereinafter, an embodiment of the invention will be described based on the drawings.

Figure 1:
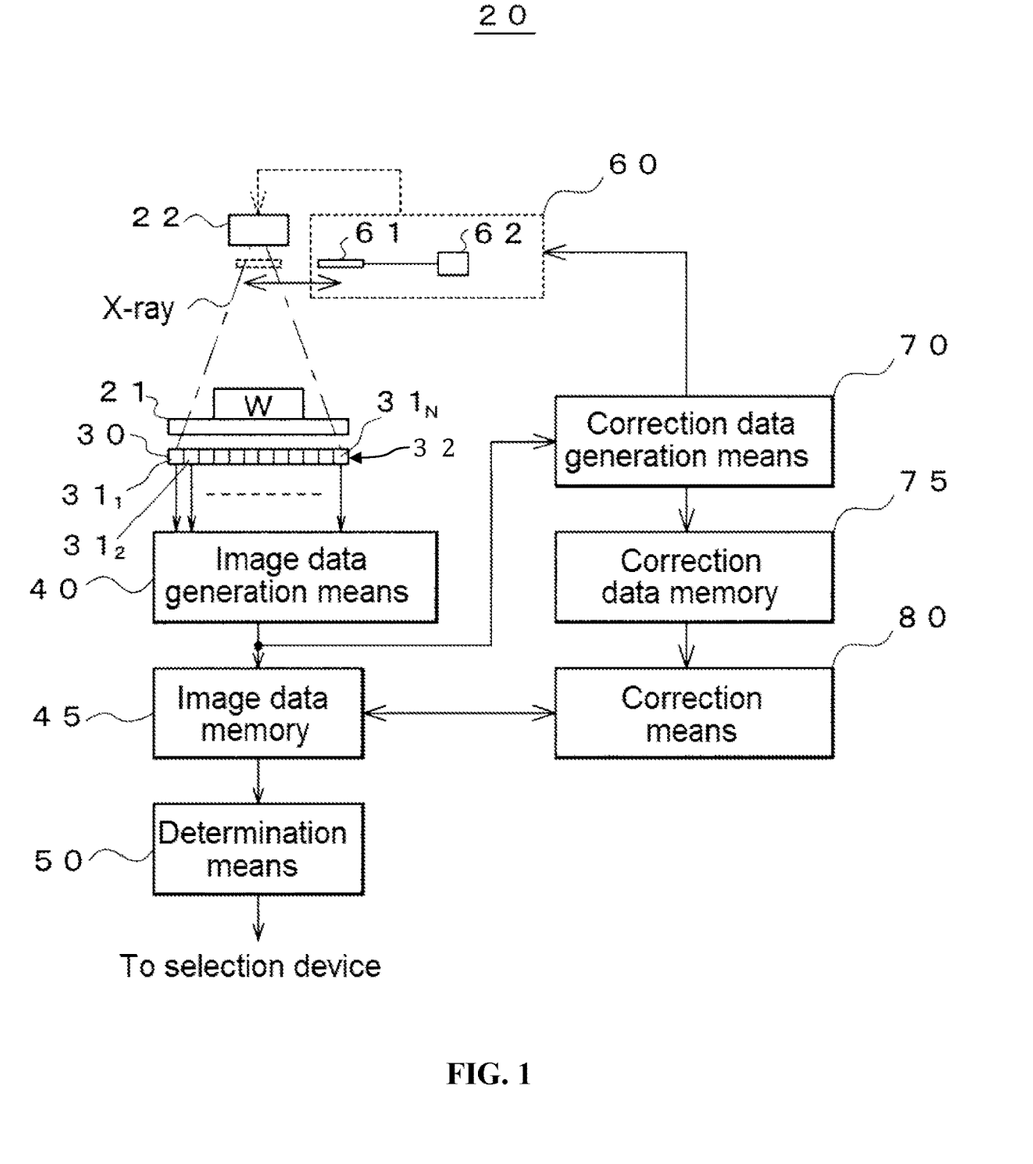
FIG. 1 is an overall configuration diagram of an embodiment of the invention.

FIG. 1 illustrates a configuration of an article inspection apparatus 20 to which the invention is applied.

The article inspection apparatus 20 includes, as basic constituents, a transport device 21, an X-ray generation source 22, X-ray detection means 30, image data generation means 40, an image data memory 45, and determination means 50. First, these basic constituents will be described.

The transport device 21 transports an inspected article W in a predetermined direction (a direction orthogonal to the page of FIG. 1) in order to cause the inspected article W to pass through a predetermined inspection region. While a transport device such as a conveyor that horizontally transports the inspected article W at a constant speed is generally used, the transport device does not need to include a motive power source. The inspected article may be slid on a slope or may be dropped from above using the weight of the inspected article.

The X-ray generation source 22 outputs an X-ray to the inspection region through which the inspected article W passes. In the embodiment, while the X-ray is emitted from above the inspected article W transported by the transport device 21 and spreads in the width direction of the transport path of the inspected article W, the emission direction of the X-ray is not limited thereto. The X-ray may be emitted in a side direction from a side of the inspected article W.

In the X-ray generation source 22, a hot cathode X-ray tube or a grid-controlled hot cathode X-ray tube in which electrons emitted from a heated filament are accelerated and caused to hit an anode target to emit an X-ray is used as an X-ray source. In addition, a power supply that is needed for driving the X-ray tube is included in the X-ray generation source 22.

The energy of the photons of the X-ray output by the X-ray generation source 22 having the above structure is variable and not constant. The energy of the photons of the X-ray depends on the wavelength of the X-ray. That is, the X-ray output by the X-ray generation source 22 includes a plurality of different wavelength ranges. The energy of the X-ray output by the X-ray generation source 22 needs to be set within a range appropriate for inspection of the inspected article. This setting is generally performed by controlling a tube voltage or a tube current applied to the X-ray tube.

The X-ray detection means 30 is configured with a plural number N of sensor elements $31_1$ to $31_N$, each of which has a function of receiving the X-ray and converting the X-ray into an electric signal. The plural number N of sensor elements $31_1$ to $31_N$ are arranged in a row in a direction intersecting (in this example, orthogonal) with the passing direction (a direction orthogonal to the page) of the inspected article W at a position where the X-ray that is transmitted through the inspected article W is received.

Figure 15:
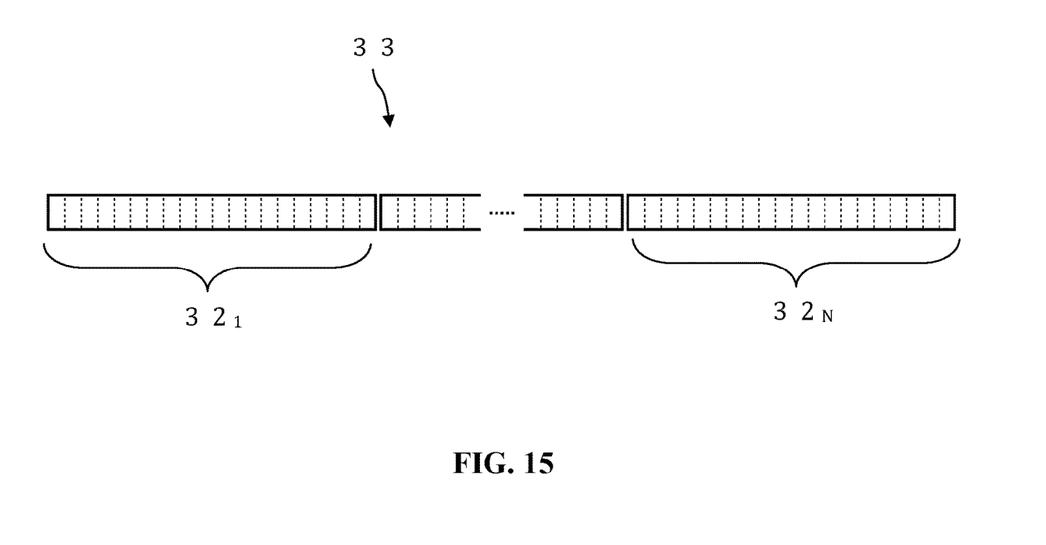
FIG. 15 is a diagram illustrating a plurality of sensor arrays.

As an actual device, the plural number N of sensor elements 311 to 31N are connected to each other as a single body to form one line sensor structure (sensor array 32) that is arranged on the lower surface side of the transport path of the transport device 21. For example, if the width of each sensor element is set to 1 mm with a small gap between each sensor element that can be ignored with respect to the width, and the width of the transport path along which the inspected article W is transported is set to 200 mm, a line sensor that includes approximately 200 sensor elements may be used. Note that, for example, if a line sensor including 20 elements is used, 10 line sensors (10 sensor arrays) 33 are arranged in a row and used as the whole X-ray detection means 30. If a line sensor including 40 elements is used, five line sensors (5 sensor arrays) 33 are arranged in a row and used as the whole X-ray detection means 30. FIG. 15 illustrates such a configuration of a plurality of line sensors (plurality of sensor arrays) 33 of individual line sensors (sensor arrays) $32_1$ to $32_N$.

Generally, a sensor element that is used in an article inspection apparatus and the like in the related art is a scintillator photosensor in which visible light is generated from an incident X-ray and is received by the photosensor and converted into an electric signal. A value acquired by integrating the energy of the visible light represents the light and shade of an image. However, each of the sensor elements $31_1$ to $31_N$ used in the X-ray detection means 30 of the article inspection apparatus 20 is a photon detection sensor element (CdTe sensor) that outputs a pulse signal having a crest value corresponding to the energy of photons each time the photons of the X-ray transmitted through the inspected article W are input. The number of pulses output per unit time period represents the light and shade of an image.

If the photon detection sensor element is used, a so-called pileup phenomenon in which only one peak value (crest value) can be acquired for a plurality of pulse signals due to an overlap between the pulse signals output from the sensor elements occurs if the amount of the X-ray input into each sensor element (the number of photons output per unit time period) is excessively large. If this phenomenon occurs at a high probability, a correct counting result for each range cannot be acquired.

In order to prevent such a phenomenon, the amount of the X-ray emitted from the X-ray generation source 22 is set within an appropriate range depending on the inspected article as described above.

The image data generation means 40 performs predetermined signal processing by separating the signals output from the sensor elements $31_1$ to $31_N$ for each predetermined period (hereinafter, referred to as a scan time period) while the inspected article W passes between the X-ray generation source 22 and the X-ray detection means 30, and for each different wavelength range, generates image data of the inspected article that is configured with information related to a two-dimensional position and the result of signal processing for each position. The two-dimensional position is determined by the passing direction of the inspected article W and the direction of arrangement of the sensor elements. The scan time period decides the unit of detection in the transport direction for the inspected article and is set to be sufficiently shorter than an article passing time period that is acquired by dividing the length of the inspected article by a transport speed.

Figure 2:
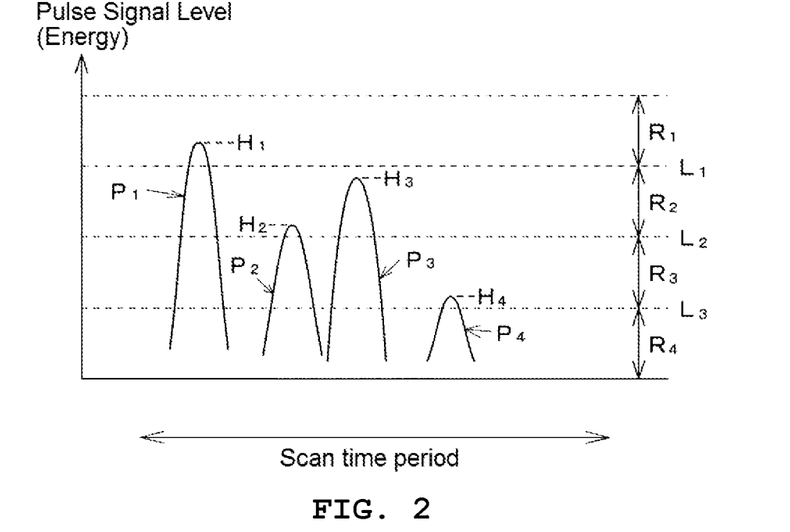
FIG. 2 is a graph illustrating a relationship between a range and a pulse signal output from a sensor element.

While each of the photon detection sensor elements $31_1$ to $31_N$ outputs one pulse signal having a crest value corresponding to the energy of photons with respect to one photon input as described above, the energy of the photons of the X-ray output from the X-ray generation source 22 is variable and not constant as described above. Accordingly, crest values $H_1$, $H_2$, $H_3$, . . . of pulse signals $P_1$, $P_2$, $P_3$, . . . output from each sensor elements vary as illustrated in FIG. 2. Each of these variable crest values corresponds to the wavelength of the X-ray.

In other words, X-rays having different energy levels (corresponds to wavelengths) coexist, and a determination as to which of ranges $R_1$ to $R_M$ each of the crest values $H_1$, $H_2$, $H_3$, . . . of pulse signals output from one X-ray sensor within the scan time period falls into is performed. The ranges $R_1$ to $R_M$ are set in advance by dividing the whole crest value output range into a plural number M (in FIG. 2, M=4) of ranges. If the number of pulse signal inputs within the scan time period is cumulated for each range, a plurality of pieces of image data having different ranges of X-ray transmission energy (that is, wavelength ranges) can be generated.

Figure 3:
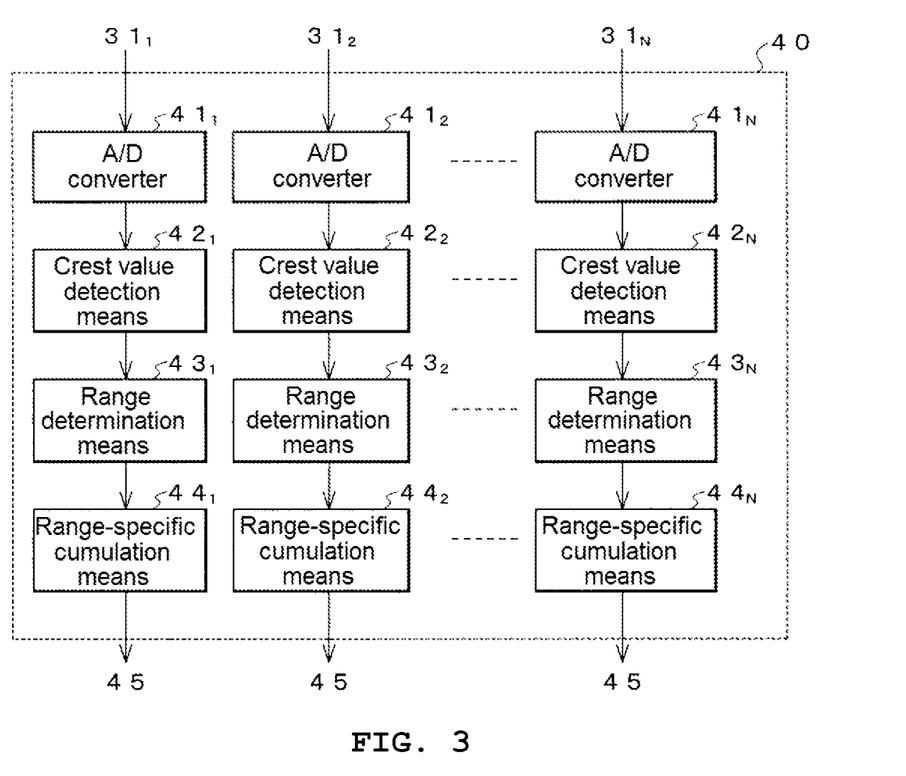
FIG. 3 is a configuration example of a main part of the embodiment of the invention.

In order to implement this, as illustrated in FIG. 3, the image data generation means 40 converts the output signals of the sensor elements $31_1$ to $31_N$ into digital data sequences using A/D converters $41_1$ to $41_N$ respectively, and inputs the data sequences into crest value detection means $42_1$ to $42_N$.

Each of the crest value detection means $42_1$ to $42_N$ detects the crest value of the pulse signal from the input data sequence. For example, the input data sequence is differentiated, and a zero-crossing timing when the differential value (the inclination of the signal) changes to a predetermined negative value or lower from a predetermined positive value or higher is detected. Then, a data value at the zero-crossing timing is detected as the crest value of the pulse signal, and the crest value is output to each of range determination means $43_1$ to $43_N$.

The range determination means $43_1$ to $43_N$ compare the crest values detected by the crest value detection means $42_1$ to $42_N$ with boundary value ranges $L_1$ to $L_{M-1}$ that divide the above crest value output range into the plural number M of ranges $R_1$ to $R_M$, determine which ranges the crest values fall into, and output range identification signals representing the ranges into which the crest values fall to range-specific cumulation means $44_1$ to $44_N$.

The range-specific cumulation means $44_1$ to $44_N$ receive the range identification signals output within the scan time period from the range determination means $43_1$ to $43_N$ respectively, cumulate the number of inputs of the range identification signals indicating the same range, and acquire and output the cumulative number for each range within the scan time period in order.

The cumulative number of the range identification signals is the cumulative number of pulse signals of which the crest values fall into the same range, among the pulse signals output from one sensor element within the scan time period. The cumulative number of the range identification signals output from each of the range-specific cumulation means $44_1$ to $44_N$ within each scan time period is stored in the image data memory 45 in a parallel and time-series manner, and X-ray transmission image data of the inspected article for each range is acquired.

As a simple example, the scan time period is configured with three units. The number N of X-ray sensors is set to three. The number M of ranges of the crest values is set to three. The cumulative number of pulse signals is denoted by A(the order of the range of the crest value, the order of the scan time period, the arrangement order of the sensor element). Among the pulse signals that are output by the first sensor element $31_1$ within a first scan time period T1, the cumulative number of pulse signals of which the crest values fall into the range $R_1$ is A(1, 1, 1). The cumulative number of pulse signals of which the crest values fall into the range $R_2$ is A(2, 1, 1). The cumulative number of pulse signals of which the crest values fall into the range $R_3$ is A(3, 1, 1).

Among the pulse signals output by the second sensor element $31_2$ within the same scan time period T1, the cumulative number of pulse signals of which the crest values fall into the range $R_1$ is A(1, 1, 2). The cumulative number of pulse signals of which the crest values fall into the range $R_2$ is A(2, 1, 2). The cumulative number of pulse signals of which the crest values fall into the range $R_3$ is A(3, 1, 2).

Among the pulse signals output by the third sensor element $31_3$ within the same scan time period T1, the cumulative number of pulse signals of which the crest values fall into the range $R_1$ is A(1, 1, 3). The cumulative number of pulse signals of which the crest values fall into the range $R_2$ is A(2, 1, 3). The cumulative number of pulse signals of which the crest values fall into the range $R_3$ is A(3, 1, 3).

Similarly, among the pulse signals output by the first sensor element $31_2$ within a subsequent scan time period T2, the cumulative number of pulse signals of which the crest values fall into the range $R_1$ is A(1, 2, 1). The cumulative number of pulse signals of which the crest values fall into the range $R_2$ is A(2, 2, 1). The cumulative number of pulse signals of which the crest values fall into the range $R_3$ is A(3, 2, 1). Among the pulse signals output by the second sensor element $31_2$ within the scan time period T2, the cumulative number of pulse signals of which the crest values fall into the range $R_1$ is A(1, 2, 2). The cumulative number of pulse signals of which the crest values fall into the range $R_2$ is A(2, 2, 2). The cumulative number of pulse signals of which the crest values fall into the range $R_3$ is A(3, 2, 2). Among the pulse signals output by the third sensor element $31_3$ within the scan time period T2, the cumulative number of pulse signals of which the crest values fall into the range $R_1$ is A(1, 2, 3). The cumulative number of pulse signals of which the crest values fall into the range $R_2$ is A(2, 2, 3). The cumulative number of pulse signals of which the crest values fall into the range $R_3$ is A(3, 2, 3).

Furthermore, among the pulse signals output by the first sensor element $31_2$ within a subsequent scan time period T3, the cumulative number of pulse signals of which the crest values fall into the range $R_1$ is A(1, 3, 1). The cumulative number of pulse signals of which the crest values fall into the range $R_2$ is A(2, 3, 1). The cumulative number of pulse signals of which the crest values fall into the range $R_3$ is A(3, 3, 1). Among the pulse signals output by the second sensor element $31_2$ within the scan time period T3, the cumulative number of pulse signals of which the crest values fall into the range $R_1$ is A(1, 3, 2). The cumulative number of pulse signals of which the crest values fall into the range $R_2$ is A(2, 3, 2). The cumulative number of pulse signals of which the crest values fall into the range $R_3$ is A(3, 3, 2). Among the pulse signals output by the third sensor element $31_3$ within the scan time period T3, the cumulative number of pulse signals of which the crest values fall into the range $R_1$ is A(1, 3, 3). The cumulative number of pulse signals of which the crest values fall into the range $R_2$ is A(2, 3, 3). The cumulative number of pulse signals of which the crest values fall into the range $R_3$ is A(3, 3, 3).

Figure 4A:
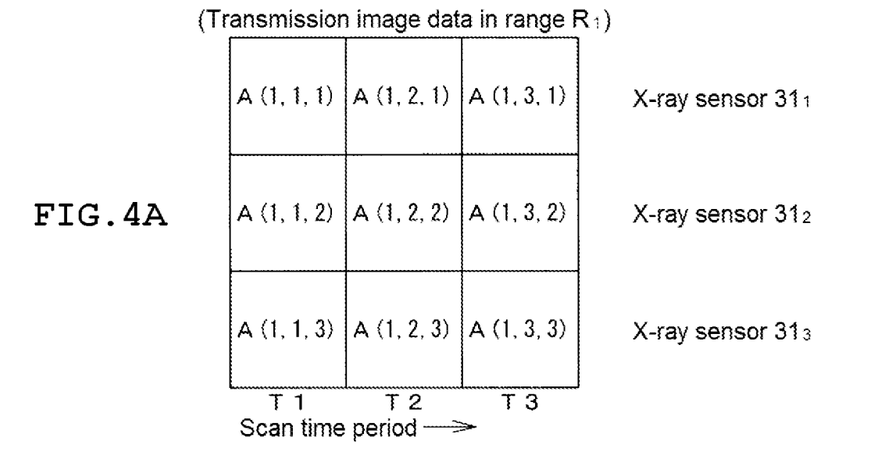
FIGS. 4A, 4B and 4c are diagrams illustrating examples of three types of image data acquired for each range of a crest value.

If nine cumulative numbers that are acquired for the range $R_1$ from the above acquired data are arranged in three rows and three columns horizontally in the order of the scan time periods and vertically in the arrangement order of the sensors as in FIG. 4A, image data of nine parts of the inspected article based on the X-ray having an energy range (wavelength range) corresponding to the range $R_1$ is acquired.

Figure 4B:
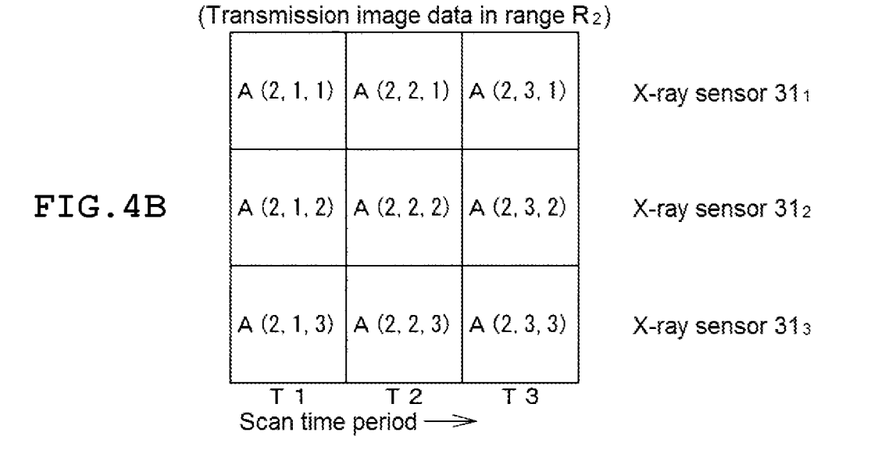
Figure 4C:
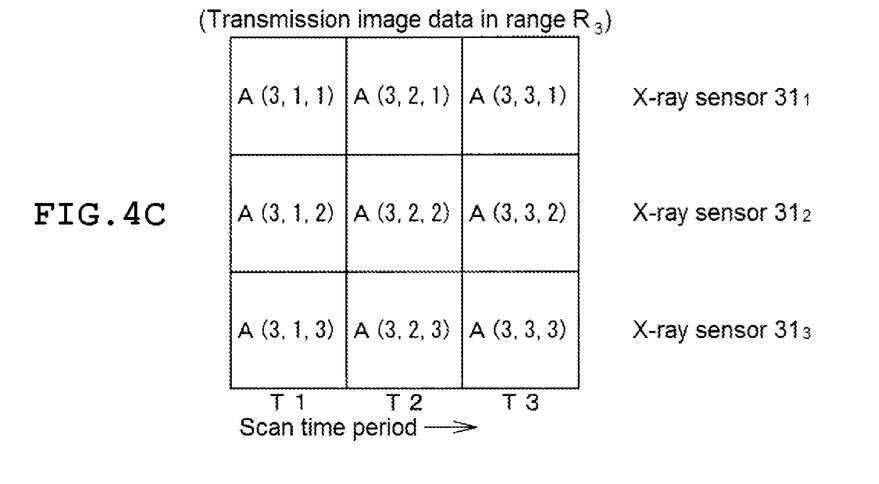

Similarly, if nine cumulative numbers acquired for the range $R_2$ are arranged in three rows and three columns as in FIG. 4B, image data of the inspected article based on the X-ray having an energy range corresponding to the range $R_2$ is acquired. If nine cumulative numbers acquired for the range $R_3$ are arranged in three rows and three columns as in FIG. 4C, image data of the inspected article based on the X-ray having an energy range corresponding to the range $R_3$ is acquired.

In actuality, the number of scans needed for foreign object inspection is equal to a value (for example, 500) that is acquired by dividing a transport time period (for example, 0.5 seconds) by the scan time period (for example, 1 millisecond). The transport time period is acquired by dividing the length in the transport direction of an article by the transport speed. The number of splits in the arrangement direction of the sensor elements corresponds to the number N (for example, 200) of sensor elements.

The image data that is acquired for each of the energy ranges (wavelength ranges) respectively corresponding to the ranges of the crest values is stored in the image data memory 45. The determination means 50 can determine the presence of a foreign object in the inspected article by performing predetermined image processing on the plurality of pieces of image data including a subtraction process that is performed in the related art.

The manner of dividing the ranges of the crest values is not limited. As one example, a range between a predetermined reference value (for example, zero) and the crest value of the pulse signal output by a sensor element at the maximum value (in the case of the X-ray tube, a theoretical value that depends on the acceleration voltage of electrons) of the energy of the photons of the X-ray emitted from the X-ray generation source 22 may be equally divided into a plurality of ranges. In addition, the number of ranges is two or more and is not limited. The image data may be initially generated in advance in a large number of ranges. Then, an optimal combination of the image data for detecting a foreign object in the inspected article may be found, and the predetermined image processing including the subtraction process may be performed using the optimal image data.

Specifically, for example, the initial number of ranges is set to 10, and the image data is generated in advance in each range. The ranges may be selectively assigned from the initial ranges to the final ranges such that, when counted from the range having the highest energy level, the first range is assigned to the range $R_1$, the third range is assigned to the range $R_2$, . . . . The predetermined imaging process may be performed using a plurality of pieces of the image data in the assigned ranges. Alternatively, the image data in the initial plurality of ranges may be merged and set as the image data in the final one range such that, when counted from the range having the highest energy level, the image data in the first and second ranges is merged and set as the image data in the range $R_1$, the image data in the third and fourth ranges is merged and set as the image data in the range $R_2$, . . . . The predetermined image processing may be performed using a plurality of pieces of the merged image data, or the merged image data and the image data in the initial ranges that do not include the merged image data.

In the specific example, the same number of pieces of image data as the number of initial ranges is generated, and arranging the ranges or merging the image data is performed depending on the optimal combination of the image data for inspection including foreign object detection. If the optimal combination of the image data for inspection of the inspected article is known, the image data may be generated for only the assigned ranges, and one piece of image data may be generated by adding the cumulative number of the range identification signals in the plurality of ranges instead of merging the plurality of pieces of image data. Accordingly, the region where the image data is stored can be saved.

As a brief description of the subtraction process, if X-ray transmission data based on different energy levels (wavelengths) is acquired for the same part, performing the subtraction process removes the effect of the thickness of the part, and only the effect of material (transmittance) appears. The difference between a change in the transmittance of the material of the inspected article and a change in the transmittance of the material of a foreign object with respect to the difference in X-ray energy becomes noticeable. Accordingly, detection sensitivity for a foreign object is increased. Besides this process, the determination means 50 detects a foreign object with higher accuracy by performing various filtering processes and the like for canceling noise and the like.

The plurality of pieces of image data acquired by the method are acquired from the output of the plurality of sensor elements arranged in a row in the direction orthogonal to the passing direction of the article. Thus, the accuracy of the acquired image data is significantly higher than that of a method in the related art that uses two line sensors. Accordingly, a foreign object and the like can be accurately detected with a small-sized configuration.

The determination result (a quality determination signal that indicates the presence of a foreign object, a missing ingredient, or the like) of the determination means is transmitted to a subsequent selection device (not illustrated), and an article that is determined as a defective product is excluded from the path of a normal product.

The above description is for the basic configuration and operation of the article inspection apparatus 20 on the assumption that the intensity of the X-ray that is emitted from the X-ray generation source 22 and incident on each sensor element of the X-ray detection means 30 in the state of the absence of the inspected article is almost equal.

However, in actuality, as described above, even if the average amount of the X-ray emitted from the X-ray generation source 22 is appropriately set, there is a problem that naturally occurs due to the structure of the article inspection apparatus 20, that is, a difference in distance to each sensor element from the X-ray generation source 22, a difference in distance in which the X-ray passes through the inspected article, and a difference in characteristics between each sensor element or each array. Even if the inspected article is inspected such that the X-ray transmittance is equal in all parts of the inspected article, there is a difference in shade of the image data acquired from the output of each sensor element.

If the X-ray detection means 30 is configured by arranging a plurality of arrays 33 in a row as described above, the sensor output is significantly reduced in a boundary part between two arrays, and whisker-shaped image noise is generated.

As means for solving such noise, incidence condition changing means 60, correction data generation means 70, a correction data memory 75, and correction means 80 are disposed in the article inspection apparatus 20 of the embodiment.

The incidence condition changing means 60 and the correction data generation means 70 operate when the operating mode of the article inspection apparatus 20 is set by an operation unit (not illustrated) to a correction data acquiring mode and not an inspection mode in which general inspection of the inspected article is performed.

When the correction data acquiring mode is set, the incidence condition changing means 60 changes two or more kinds of common X-ray incidence conditions for all of the sensor elements of the X-ray detection means 30 in the state of the absence of the inspected article of an inspection target in the inspection region.

As the incidence condition changing means 60, for example, at least one of a method of changing the X-ray incidence conditions for the sensor elements of the X-ray detection means 30 by causing a correction member to advance to or retract from a position intersecting with the passage of the X-ray between the X-ray generation source 22 and the X-ray detection means 30 or changing the attitude of the correction member by rotation and the like, or a method of changing the X-ray incidence conditions for the sensor elements of the X-ray detection means 30 by changing the tube voltage or the tube current supplied to the X-ray tube of the X-ray generation source 22 can be used. The correction member has an X-ray transmittance that changes uniformly in accordance with the position of incidence or the angle of incidence of the X-ray.

The incidence condition changing means 60 illustrated in FIG. 1 is an example of the method of causing such a correction member 61 to advance to or retract from the position intersecting with the passage of the X-ray between the X-ray generation source 22 and the X-ray detection means 30 using a drive device 62 (while the correction member 61 is moved in the spreading direction of the X-ray in FIG. 1, moving the correction member 61 in a direction orthogonal to the spreading direction of the X-ray reduces the moving distance as will be described later).

Figure 5:
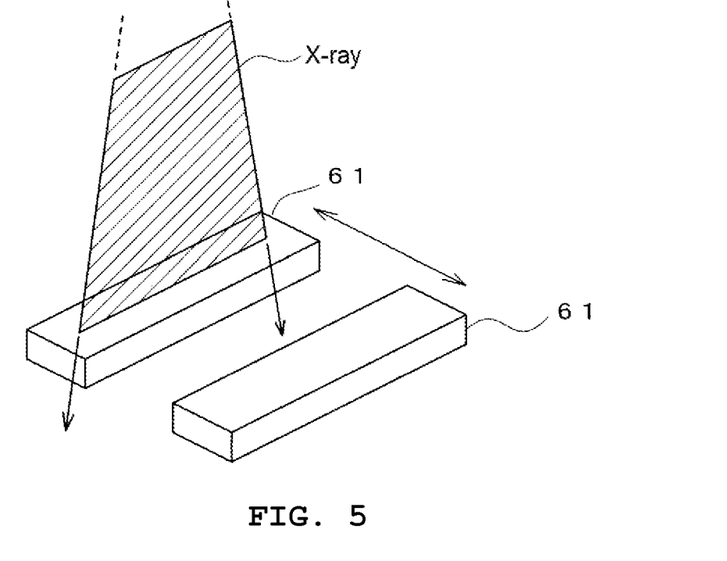
FIG. 5 is a diagram illustrating an example of a correction member.
Figure 6:
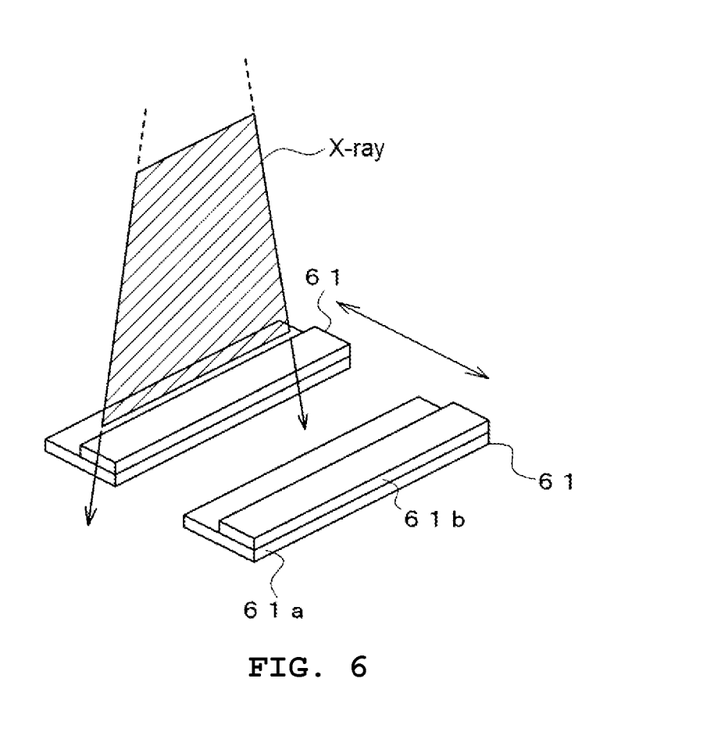
FIG. 6 is a diagram illustrating another example of the correction member.
Figure 7:
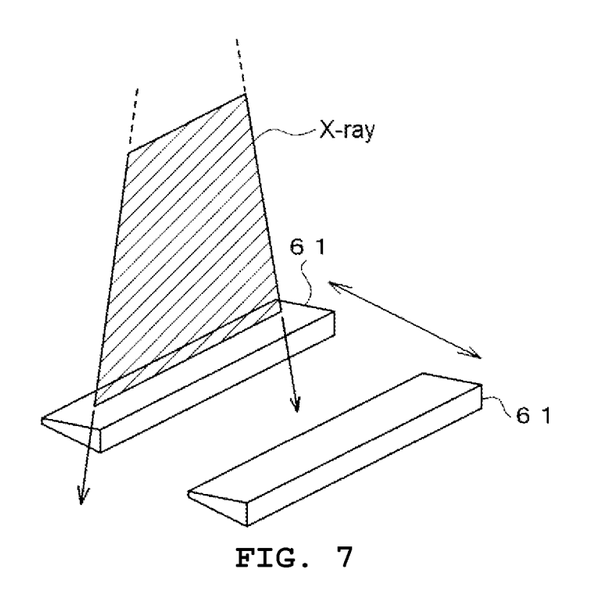
FIG. 7 is a diagram illustrating another example of the correction member.
Figure 8:
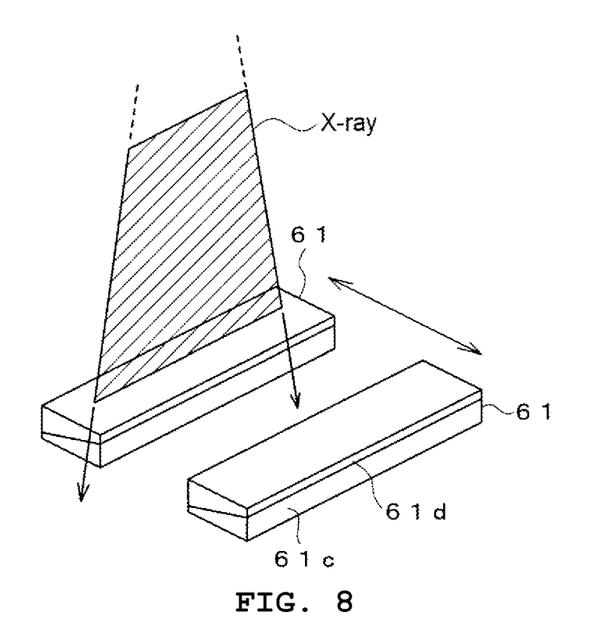
FIG. 8 is a diagram illustrating another example of the correction member.

As the correction member 61, for example, a flat-plate-shaped correction member of uniform material of which the transmittance for the X-ray transmitted to the lower surface from the upper surface is almost equal below 100% (for example, 50%) as illustrated in FIG. 5, a correction member, as illustrated in FIG. 6, acquired by stacking a plurality (in the example, two) of plates 61a and 61b of constant thickness and uniform material as in FIG. 5, a correction member of uniform material that has a changing thickness between the front end and the rear end which results in a change in X-ray transmittance from, for example, 50% to 20% as in FIG. 7, a plate-shaped correction member of constant thickness acquired by stacking plates 61c and 61d having the same shape as in FIG. 7 and different materials (for example, one has an X-ray transmittance of 50% to 20%, and the other has an X-ray transmittance of 70% to 90%) as in FIG. 8, and the like can be employed.

If the correction member 61 in FIG. 5 is used, two incidence conditions including a position (X-ray transmittance of 50%) at which the X-ray is transmitted to the lower surface from the upper surface, and a position (X-ray transmittance of 100%) that the X-ray does not intersect with and passes by can be set. If the correction member 61 in FIG. 6 is used, three incidence conditions including a position (X-ray transmittance of 25%) at which the X-ray is transmitted to the lower surface from the top (the upper surface of the plate 61b), a position (X-ray transmittance of 50%) at which the X-ray is transmitted to the lower surface from the middle (the upper surface of the plate 61a), and a position (X-ray transmittance of 100%) that the X-ray does not intersect with and passes by can be set. If the correction member 61 in FIG. 7 is used, incidence conditions including any position (any X-ray transmittance) between the position of the largest thickness and the position of the smallest thickness (X-ray transmittance of 50% to 20%), and a position (X-ray transmittance of 100%) that the X-ray passes by can be set. Even if the correction member 61 in FIG. 8 is used, incidence conditions including any position (any X-ray transmittance) between the position of the largest thickness and the position of the smallest thickness (transmittance of 35% to 18%) in one plate 61c, and a position (transmittance of 100%) that the X-ray passes by can be set.

Figure 9:
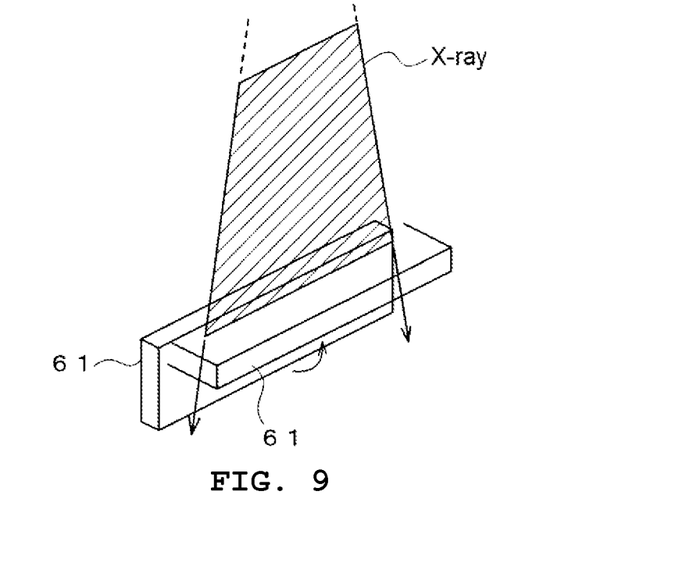
FIG. 9 is a diagram illustrating another example of the correction member.

Besides the method of sliding movement, a method of pivoting the correction member 61 supported at a position on a side of the passage of the X-ray to a position intersecting with the passage of the X-ray using the drive device 62 as in FIG. 9, and the like can also be employed.

For the image data acquired by the image data generation means 40 for each incidence condition changed by the incidence condition changing means 60, the correction data generation means 70 acquires correction data that is needed for making the shade of the image data uniform for each incidence condition, and stores the correction data in the correction data memory 75. At the time of acquiring the correction data, a decrease in accuracy is prevented by driving the transport device 21 in advance and using image data in which a change in image data caused by the thickness or a seam of the belt is averaged.

The correction data mainly includes an element Ha for compensating a change in the incident intensity of the X-ray that depends on the distance to each sensor element from the X-ray generation source 22, an element Hb for compensating a difference in distance in which the X-ray passes through the inspected article, an element Hc for compensating a difference in X-ray sensitivity between each array, an element Hd for compensating a difference in sensitivity between each sensor element in the array, an element He for compensating noise generated at a boundary between arrays, and an element Hf based on other X-ray transmitting members (for example, a belt support member of the transport means 21, and an emission opening cover of the X-ray generation source 22).

Among the compensating elements, Hb depends on the material, thickness, and the like of the inspected article. Thus, using a member having a transmittance and a thickness similar to the inspected article of an inspection target as the correction member 61 can reduce a correction error. Ideally, it is considered that a part of uniform material and constant thickness as an ingredient of the inspected article of an inspection target is used as the correction member 61.

If the shade of an image that is acquired from the output of a j-th sensor element 31(i, j) in an i-th array on a first incidence condition (for example, a transmittance of 100%) is denoted by A1(i, j), and the ideal shade of the image is denoted by R1(i, j), the following are established.

$$A1(i,j)=R1(i,j)+H(i,j)$$

$$H(i,j)=Ha(i,j)+Hb(i,j)+Hc(i,j)+Hd(i,j)+He(i,j)+Hf(i,j)$$

If the shade of the image that is acquired from the output on a second incidence condition (for example, a transmittance of 30%) is denoted by A2(i, j), and the ideal shade of the image is denoted by R2(i, j), the following is established.

$$A2(i,j)=R2(i,j)+H(i,j)$$

While the shade acquired by image processing is represented by the sum of the ideal shade and a compensating term in the above general formula, the shade acquired by image processing may be represented by the product of the ideal shade and the compensating term.

Figure 10:
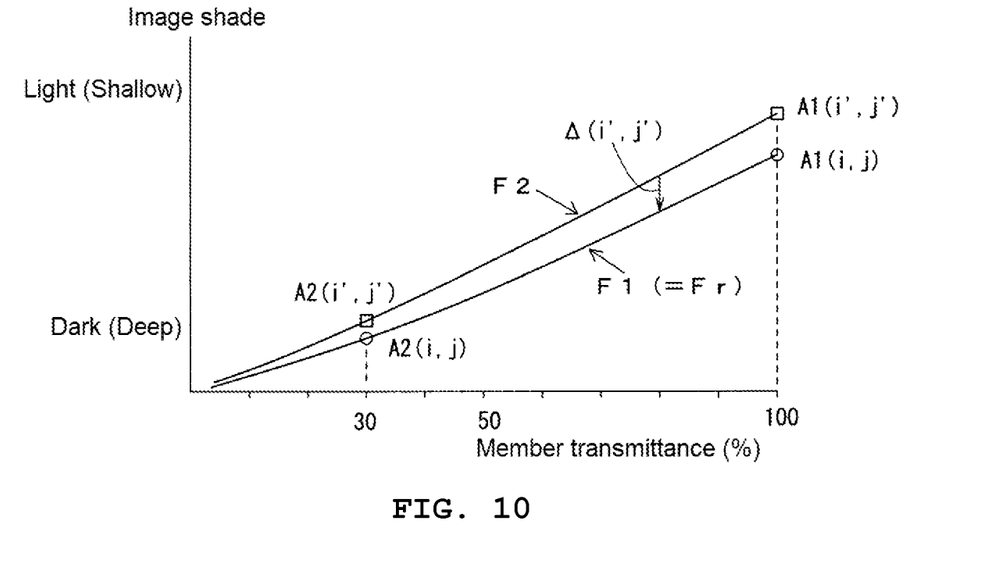
FIG. 10 is a graph illustrating a relationship between an incidence condition and an image shade.

From two different transmittances and the image shade for each transmittance, for example, transmittance to image shade characteristics F1, F2, . . . as in FIG. 10 are acquired for each sensor element. Since the characteristics F1, F2, . . . are characteristics of the image shade for two different incidence conditions of transmittances 100% and 30%, the characteristics F1, F2, . . . represents output characteristics of sensor elements in a low transmittance region with sufficient accuracy. The characteristics F1, F2, . . . can be approximated using, for example, a quadratic function or an exponential function.

If the characteristic F1 belongs to the sensor element 31(i, j), and H(i, j)=0 is set, that is, the shade of the image acquired from the output of the sensor element 31(i, j) is set as the ideal shade, an ideal transmittance to image shade characteristic Fr=F1 is determined from the shades A1(i, j)

and A2(i, j) at transmittances 100% and 30% respectively. Since the transmittance can be theoretically replaced by the shade, the ideal characteristic Fr uniquely decides a relationship between a theoretical shade and the shade of the image acquired by the image data generation means 40.

Accordingly, for example, transmittance to image shade difference data Δ(i', j') that is used for causing the transmittance to image shade characteristic F2 acquired from the shade of the image acquired from the sensor element 31(i', j') to match the ideal characteristic Fr is acquired as the correction data and stored in the correction data memory 75. The image data of the inspected article can be accurately acquired by correcting, using the correction data, the image data that is acquired from the output of the sensor element 31(i', j') at the time of inspecting the inspected article.

While the transmittance to image shade characteristic of the image acquired from the output of one sensor element is set as the ideal characteristic in the above description, the ideal characteristic may be a theoretical characteristic or may be acquired as the average of the transmittance to image shade characteristics acquired for a plurality of sensor elements.

While the transmittance is changed in two steps of 100% and 30% in the above example, the transmittance may be changed in three steps of 100%, 60%, and 30%, or may be changed to two or more kinds excluding 100%.

Besides the changing of the incidence conditions using the correction member 61, the incidence conditions may be changed by changing the tube current or the tube voltage of the X-ray tube of the X-ray generation source 22 as described above. In this case, while changing the tube current or the tube voltage causes a change in X-ray incidence condition for each sensor element, the same correction data as described above can be acquired by regarding this change as a change in transmittance caused by the correction member 61 in calculation. A change in transmittance (for example, 100% and 30%) caused by the correction member 61 may be combined with a change in tube current (for example, a half) or tube voltage.

If the photon detection sensor element is used as described above, the correction data is acquired for each energy level (each range R).

The image data that is acquired by the image data generation means 40 when the inspected article passes through the inspection region during the actual inspection mode is corrected by the correction means 80 based on the correction data read from the correction data memory 75. For example, this correction is performed on the original image data stored in the image data memory 45 using the correction data, and the image data acquired by correction is stored in the image data memory 45 (the original image data may be either maintained or overwritten with the corrected image data). Accordingly, the image data that is used for determination by the determination means 50 is the corrected image data.

Figure 11:
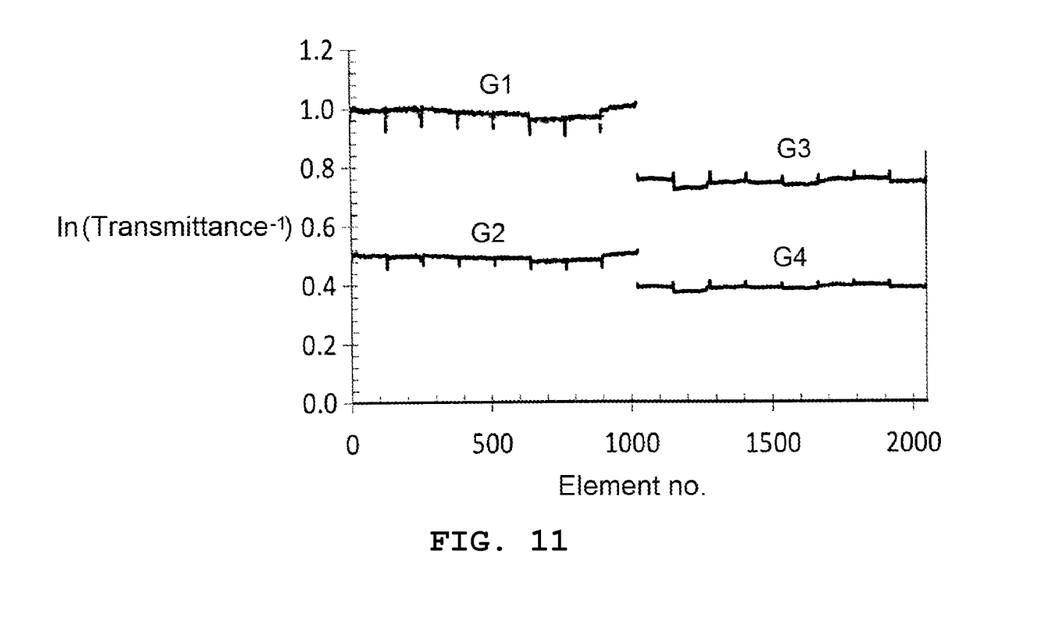
FIG. 11 is a graph illustrating an image correction result of a correction process in the related art.

FIG. 11 illustrates correction results G1 and G2 and correction results G3 and G4. The correction results G1 and G2 are acquired in a case where a correction method based on a transmittance of 100% in the related art is used for images on a low energy side acquired from the output of half (left half of 1,000) of all of the sensor elements in the X-ray detection means 30 in which a plurality of sensor arrays 33 are arranged in a row. The correction results G3 and G4 are acquired in a case where the correction method based on a transmittance of 100% in the related art is used for images on a high energy side acquired from the output of the remaining half (right half of 1,000) of the sensor elements.

In FIG. 11, in the correction results G1 and G2, whisker-shaped noise that extends downward at the boundary between arrays is present. In addition, both end sides tend to be slightly increased due to a difference in distance, and an error occurs between arrays. In the correction results G3 and G4, whisker-shaped noise extends upwards at the boundary between arrays, and an error occurs between arrays.

Figure 12:
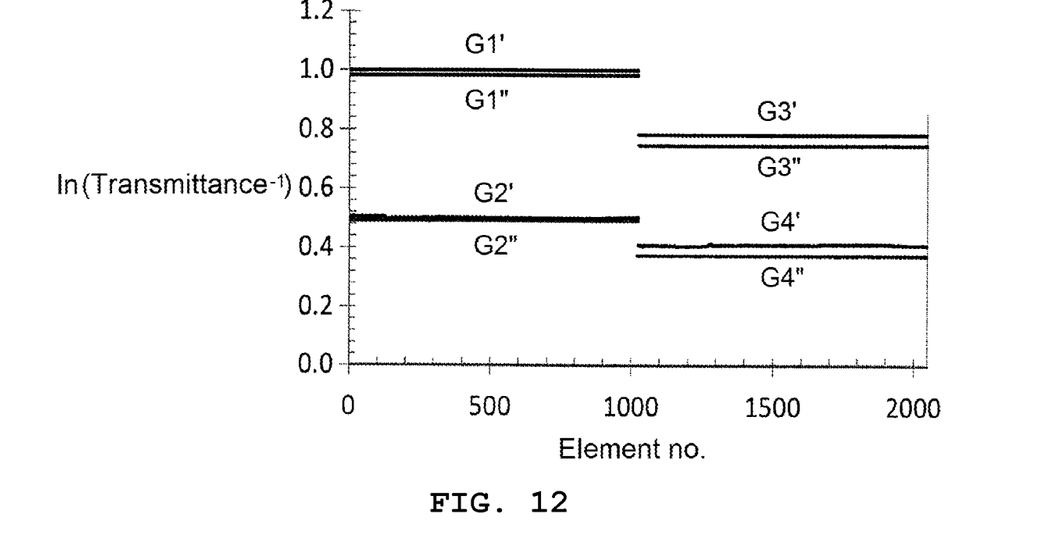
FIG. 12 is a graph illustrating an image correction result of a correction process of the invention.

Meanwhile, FIG. 12 illustrates correction results G1' and G2' and correction results G3' and G4'. The correction results G1' and G2' are based on the correction data that is acquired by changing the transmittance in two steps (100% and 30%) as described in the embodiment for the images on the low energy side acquired from the output of the half (left half of 1,000) of all of the sensor elements in the X-ray detection means 30 in which a plurality of sensor arrays 33 are arranged in a row. The correction results G3' and G4' are based on the correction data that is acquired by changing the transmittance in two steps (100% and 30%) for the images on the high energy side acquired from the output of the remaining half (right half of 1,000) of the sensor elements. In addition, G1" to G4" are correction results based on the correction data that is acquired by changing the transmittance in three steps (100%, 60%, and 30%).

The correction results G1' to G4' and G1" to G4" are represented by straight lines that are almost parallel to the horizontal axis. Whisker-shaped noise at the boundary between arrays is suppressed, and an error almost does not occur between arrays or in an array. Thus, it is understood that images of almost uniform shades are acquired regardless of the position of each sensor element.

While the sensor elements of the X-ray detection means 30 in the embodiment have an energy discrimination function that enables a plurality of transmission images to be acquired at the same time by detecting the photons of the X-ray for each energy level, a scintillation sensor element that first converts the X-ray into light and converts the light into an electric signal using a photodiode may be used as each sensor element. In this case, since the output of each sensor element corresponds to the image shade, the correction data can be generated using the output of each sensor element as the image data.

While the incidence condition changing means 60 changes the incidence conditions by moving, using the drive device 62, the correction member 61 that can change the X-ray transmittance, the correction member 61 may be manually operated to advance to or retract from the passage of the X-ray, or the correction member 61 may be transported by the transport device 21. In addition, the inspected article of which the transmittance is regarded as being uniform can be used instead of the correction member 61 as described above.

As described above, using a correction member of material similar to the inspected article at the time of generating the correction data can reduce an error for the element Hb that depends on the inspected article. Thus, using a correction member that corresponds to the inspected article as an inspection target candidate, the correction data for each article type of inspected article may be generated in advance and registered in advance in the correction data memory 75. At the time of actual inspection, the correction means 80 may be configured to read the correction data corresponding to a specified article type from the correction data memory 75 in response to an operation of specifying the article type of the inspected article, and use the correction data for correction.

If a function of specifying the article type of the inspected article from characteristics such as a shade distribution of the image data acquired for the inspected article is provided, the correction means 80 may be configured to read correction data corresponding to the specified article type from the correction data memory 75 and use the correction data for correction. In this case, even if inspection is performed at the time of switching the article type or in a state where similar article types coexist, image correction is performed by automatically selecting the correction data appropriate for the inspected article. Thus, a determination in foreign object inspection can be correctly made.

While the timing of acquiring the correction data using the incidence condition changing means 60 and the correction data generation means 70 is not limited, the correction data needs to be acquired at the time of producing the article inspection apparatus 20, at the time of replacing service parts or adding optional parts that may affect the X-ray, and the like.

DESCRIPTION OF REFERENCE NUMERALS AND SIGNS

20 ARTICLE INSPECTION APPARATUS
21 TRANSPORT DEVICE
22 X-RAY GENERATION SOURCE
30 X-RAY DETECTION MEANS
$31_1$ TO $31_N$ SENSOR ELEMENT
40 IMAGE DATA GENERATION MEANS
45 IMAGE DATA MEMORY
50 DETERMINATION MEANS
60 INCIDENCE CONDITION CHANGING MEANS
61 CORRECTION MEMBER
70 CORRECTION DATA GENERATION MEANS
75 CORRECTION DATA MEMORY
80 CORRECTION MEANS

What is claimed is:

1. An X-ray inspection apparatus comprising:
    transport means for transporting an inspected article to pass through a predetermined inspection region;
    an X-ray generation source that irradiates the predetermined inspection region with an X-ray;
    X-ray detection means for receiving the X-ray passing through the predetermined inspection region, the X-ray detection means comprising a plurality of sensor elements that are arranged in a direction intersecting with a transport direction of the inspected article;
    image data generation means for generating image data of the inspected article from an output of the X-ray detection means;
    incidence condition changing means for changing two or more kinds of X-ray incidence conditions common for all of the plurality of sensor elements of the X-ray detection means in a state of absence of the inspected article in the predetermined inspection region;
    correction data generation means for acquiring correction data that is needed for making a shade of an image of the image data generated by the image data generation means uniform for each X-ray incidence condition of the two or more kinds of X-ray incidence conditions changed by the incidence condition changing means;
    correction means for correcting the image data generated when the inspected article passes through the predetermined inspection region, based on the correction data; and
    determination means for determining a quality of the inspected article from the image data corrected by the correction means.

2. The X-ray inspection apparatus according to claim 1, wherein the incidence condition changing means includes a correction member that is disposed between the X-ray generation source and the X-ray detection means, and changes an X-ray transmittance.

3. The X-ray inspection apparatus according to claim 2, further comprising:
    a correction data memory in which the correction data is stored,
    wherein the correction data that is acquired using the correction member corresponding to a plurality of inspected articles for each inspected article is stored in the correction data memory, and
    wherein the correction means corrects the image data by selecting the correction data appropriate for the inspected article from the correction data memory.

4. The X-ray inspection apparatus according to claim 1, wherein the incidence condition changing means includes means for changing at least one of a tube voltage or a tube current in the X-ray generation source.

5. The X-ray inspection apparatus according to claim 1, wherein the X-ray detection means comprises a plurality of sensor arrays, each sensor array comprising sensor elements arranged at predetermined intervals as a single sensor array, and
    wherein the correction data generation means uses correction data specific to each sensor array as a part of the correction data needed for making the shade of the image generated by the image data generation means uniform.

6. The X-ray inspection apparatus according to claim 1, wherein the plurality of sensor elements of the X-ray detection means have an energy discrimination function.

7. A correction method for an X-ray inspection apparatus that irradiates a predetermined inspection region, where an inspected article passes, with an X-ray, receives the X-ray passing through the predetermined inspection region using a plurality of sensor elements arranged in a direction intersecting with a transport direction of the inspected article, and determines a quality of the inspected article from image data of the inspected article generated from an output of the plurality of sensor elements, the correction method comprising:
    a step of changing two or more kinds of X-ray incidence conditions common for all of the plurality of sensor elements in a state of absence of the inspected article in the predetermined inspection region;
    a step of acquiring correction data that is needed for making a shade of an image of the generated image data uniform for each X-ray incidence condition of the changed two or more kinds of X-ray incidence conditions; and
    a step of correcting the image data generated when the inspected article passes through the predetermined inspection region, based on the correction data.

8. The correction method according to claim 7, wherein the step of changing two or more kinds of X-ray incidence conditions changes an X-ray transmittance by using a correction member that is disposed between an X-ray generation source and the plurality of sensor elements.

9. The correction method according to claim 8, further comprising:
    a step of storing the correction data in correction data memory,
    wherein the correction data that is acquired using the correction member corresponding to a plurality of inspected articles for each inspected article is stored in the correction data memory, and wherein the step of correcting the image data corrects the image data by selecting the correction data appropriate for the inspected article from the correction data memory.

10. The correction method according to claim 7, wherein the step of changing two or more kinds of X-ray incidence conditions changes at least one of a tube voltage or a tube current in an X-ray generation source.

11. The correction method according to claim 7, wherein the X-ray inspection apparatus comprises a plurality of sensor arrays, each sensor array comprising sensor elements arranged at predetermined intervals as a single sensor array, and the step of acquiring the correction data acquires correction data specific to each sensor array as a part of the correction data needed for making the shade of an image generated from the output of the plurality of sensor arrays uniform.

12. The correction method according to claim 7, wherein the plurality of sensor elements have an energy discrimination function.

\* \* \* \* \*